(12) United States Patent
Hoover et al.

(10) Patent No.: US 8,554,142 B2
(45) Date of Patent: Oct. 8, 2013

(54) CELLULAR NETWORK TRAFFIC OFFLOAD VIA LOCAL WIRELESS CONNECTIVITY

(75) Inventors: Scott J. Hoover, Allen, TX (US); Paul V. Hubner, McKinney, TX (US); Gary L. Campbell, Allen, TX (US); Joseph A. Hilburn, Frisco, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 172 days.

(21) Appl. No.: 13/164,318

(22) Filed: Jun. 20, 2011

(65) Prior Publication Data

US 2012/0322480 A1 Dec. 20, 2012

(51) Int. Cl.
*H04B 7/00* (2006.01)

(52) U.S. Cl.
USPC .......................... 455/41.2; 455/3.01; 455/507

(58) Field of Classification Search
USPC ........................ 455/3.01, 41.2, 507
See application file for complete search history.

(56) References Cited

U.S. PATENT DOCUMENTS

| | | | |
|---|---|---|---|
| 2002/0098849 A1* | 7/2002 | Bloebaum et al. | 455/456 |
| 2011/0314139 A1* | 12/2011 | Song et al. | 709/223 |

* cited by examiner

Primary Examiner — Tuan H Nguyen

(57) ABSTRACT

A network device receives, from a first mobile communication device via a cellular network, a message to attempt initiate the set-up of data transfer via a local wireless connectivity method. The network device determines a proximity within the cellular network of the first mobile communication device with respect to a second mobile communication device that is the target of the data transfer, and determines a geographic proximity of the first mobile communication device with respect to the second mobile communication device. The network device remotely enables, from the network device, the first mobile communication device and the second mobile communication device to transfer data between them via the local wireless connectivity method instead of via the cellular network based on the determined network proximity or geographic proximity.

21 Claims, 10 Drawing Sheets

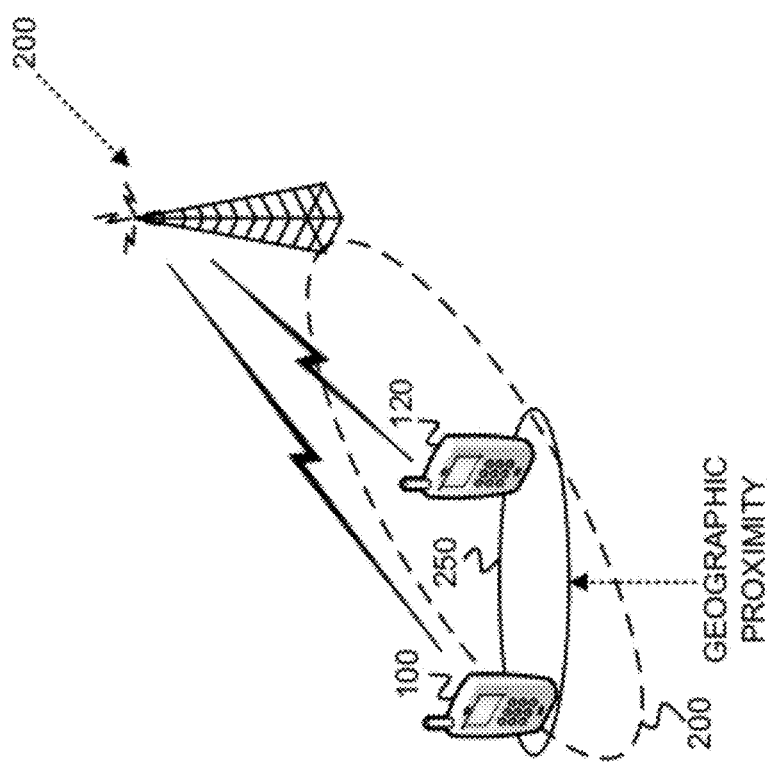

CELLULAR NETWORK TRAFFIC OFFLOAD VIA LOCAL WIRELESS CONNECTIVITY

BACKGROUND

Cellular networks include several components that work together to complete a connection. These include a backbone network, local infrastructure, and an over-the-air (OTA) segment. The most crowded and constrained portion of these components typically is the OTA segment. Wireless providers typically attempt to actively manage the amount of data on the OTA segment to increase the number of simultaneous connections.

BRIEF DESCRIPTION OF THE DRAWINGS

FIGS. 2A-2C depict examples of the determination of a proximity between the sender and the recipient of FIG. 1;

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Figure 1:
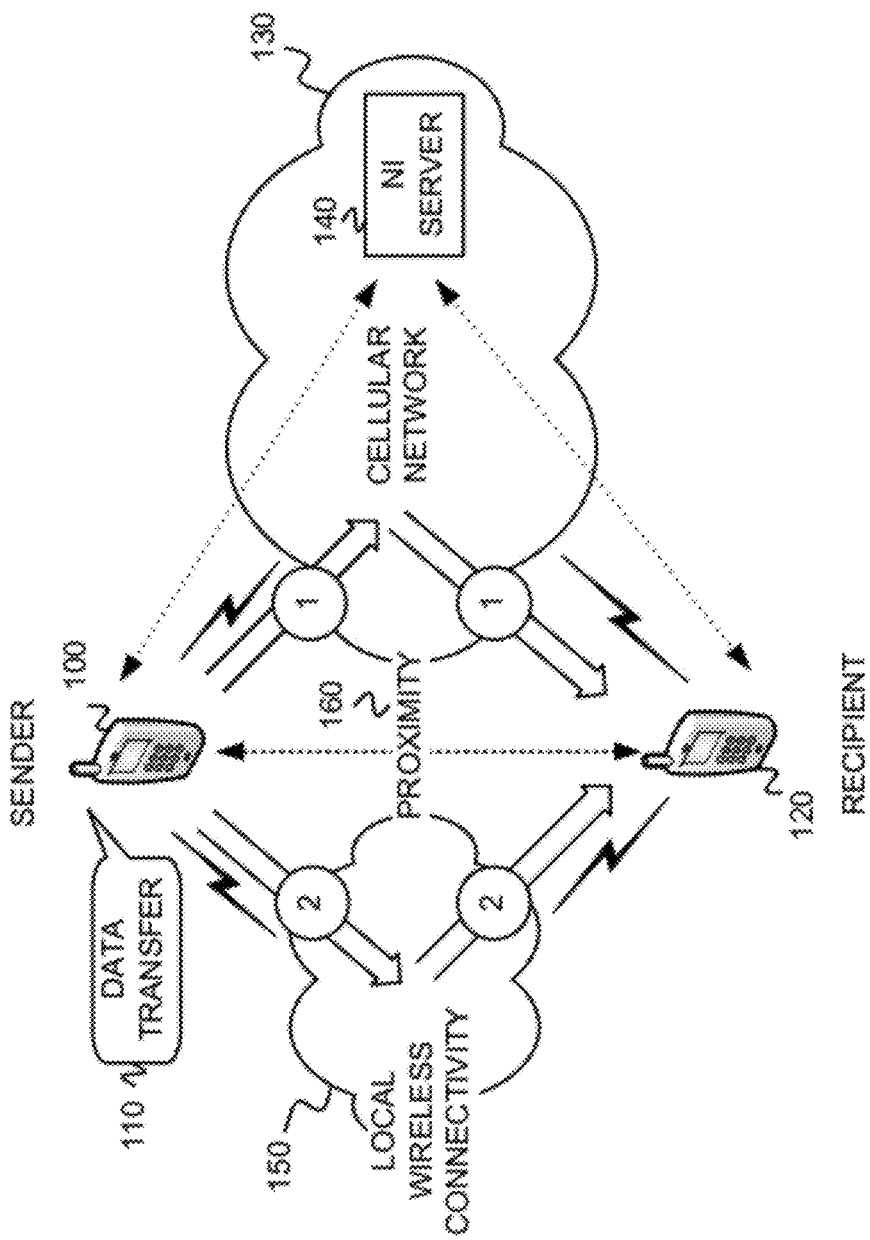
FIG. 1 is a diagram that depicts an exemplary overview of the selective use of local wireless connectivity at a mobile device for transferring data to another device instead of using a connection via an OTA segment of the cellular network servicing the mobile device.

FIG. 1 illustrates an overview of the selective use of local wireless connectivity, such as, for example, BlueTooth or WiFi connectivity, at a mobile device for transferring data to another device instead of using a connection via an over-the-air (OTA) segment of the cellular network servicing the mobile device. As shown in FIG. 1, a sending mobile device 100 (labeled "sender" in FIG. 1) may seek to engage in data transfer 110 with a receiving mobile device 120 (labeled "recipient" in FIG. 1). Sender 100 and recipient 120 may include any type of digital device that has the capability to communicate and transfer data via a cellular network and via one or more other wireless connections (e.g., BlueTooth wireless, "Wi-Fi," ultra-wideband (UWB), Digital Enhanced Cordless Telelcommunications (DECT), other personal area networks, etc.). The one or more other wireless connections may include short-range connections used for communications between sender 100 and recipient 120 (e.g., local wireless connectivity). Sender 100 and recipient 120 may include, for example, a computer (e.g., a desktop, laptop, palmtop, or tablet computer), a cellular telephone (e.g., a smart phone), a personal digital assistant (PDA), a media player device, or a digital camera.

Sender 100 may, via cellular network 130, contact a Network Information (NI) server 140 to determine whether the data transfer should occur via cellular network 130 or via local wireless connectivity 150 (e.g., via a personal area network (PAN) channel). Based on a determined proximity 160 of sender 100 to recipient 120, NI server 140 may remotely enable sender 100 to transfer the data to recipient 120 via local wireless connectivity 150 instead of via cellular network 130. The determined proximity 160 of sender 100 to recipient 120 may include a network proximity and/or a geographic proximity. For example, the network proximity may include determining whether sender 100 and recipient 120 are currently being served by the same base station (BS), cell antenna, and/or antenna sector of cellular network 130. The geographic proximity may include, for example, determining whether sender 100 and recipient 120 are geographically collocated (e.g., located geographically within a certain distance of one another). In one exemplary implementation, determining whether sender 100 and recipient 120 are geographically collocated may include determining if sender 100 and recipient 120 are close enough to one another to permit a wireless connection via the local wireless connectivity method (e.g., approximately 5 meters for BlueTooth Class 3, approximately 10 meters for BlueTooth Class 2, or approximately 100 meters for BlueTooth Class 1). Cellular network 130 may include one or more wireless public land mobile networks (PLMNs) (e.g., a Code Division Multiple Access (CDMA) 2000 PLMN, a Global System for Mobile Communications (GSM) PLMN, a Long Term Evolution (LTE) PLMN and/or other types of PLMNs). Cellular network 130 may include, as described below (but not shown in FIG. 1), one or more access service networks and one or more connectivity service networks.

If the proximity 160 of sender 100 and recipient 120, as determined by NI server 140, does not satisfy a proximity criteria, then NI server 140 may direct sender 100 to engage in data transfer 110 via cellular network 130 (shown as a "1" within a circle in FIG. 1). If the proximity 160 of sender 100 and recipient 120, as determined by NI server 140, does satisfy a proximity criteria, then NI server 140 may remotely enable sender 100 to engage in data transfer 110 with recipient 120 via local wireless connectivity 150 (shown as a "2" within a circle in FIG. 1) instead of via cellular network 130, thus, reducing the traffic load on an OTA segment of cellular network 130.

Figure 2A:
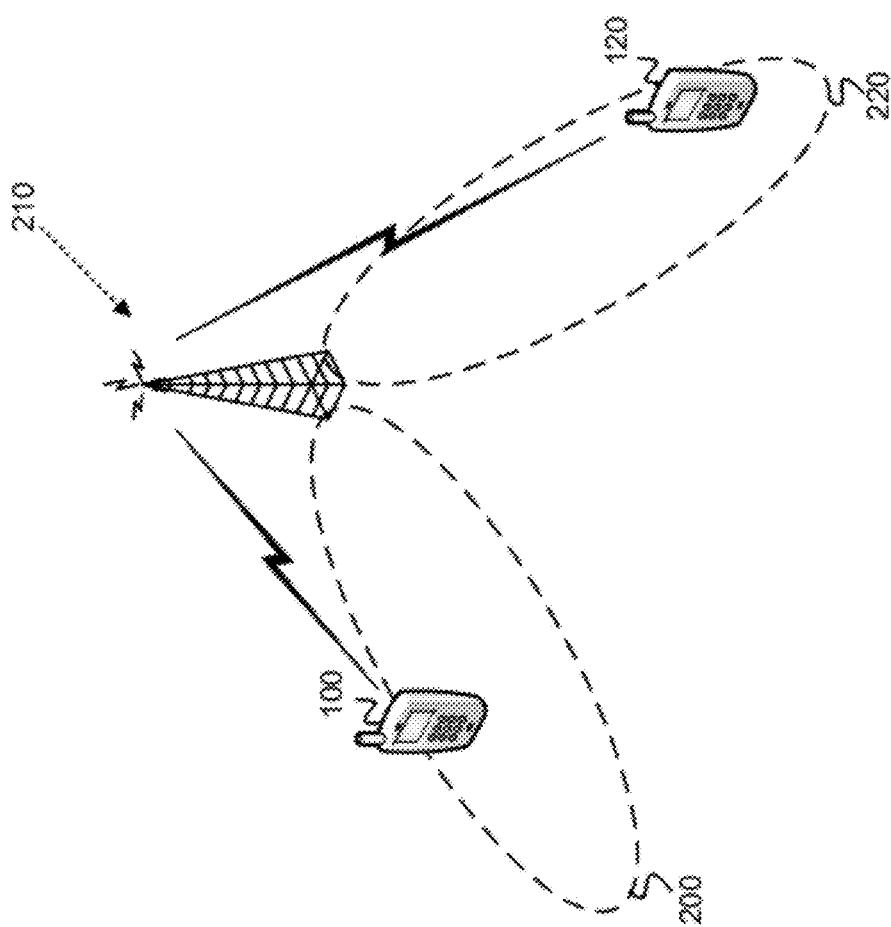
Figure 2B:
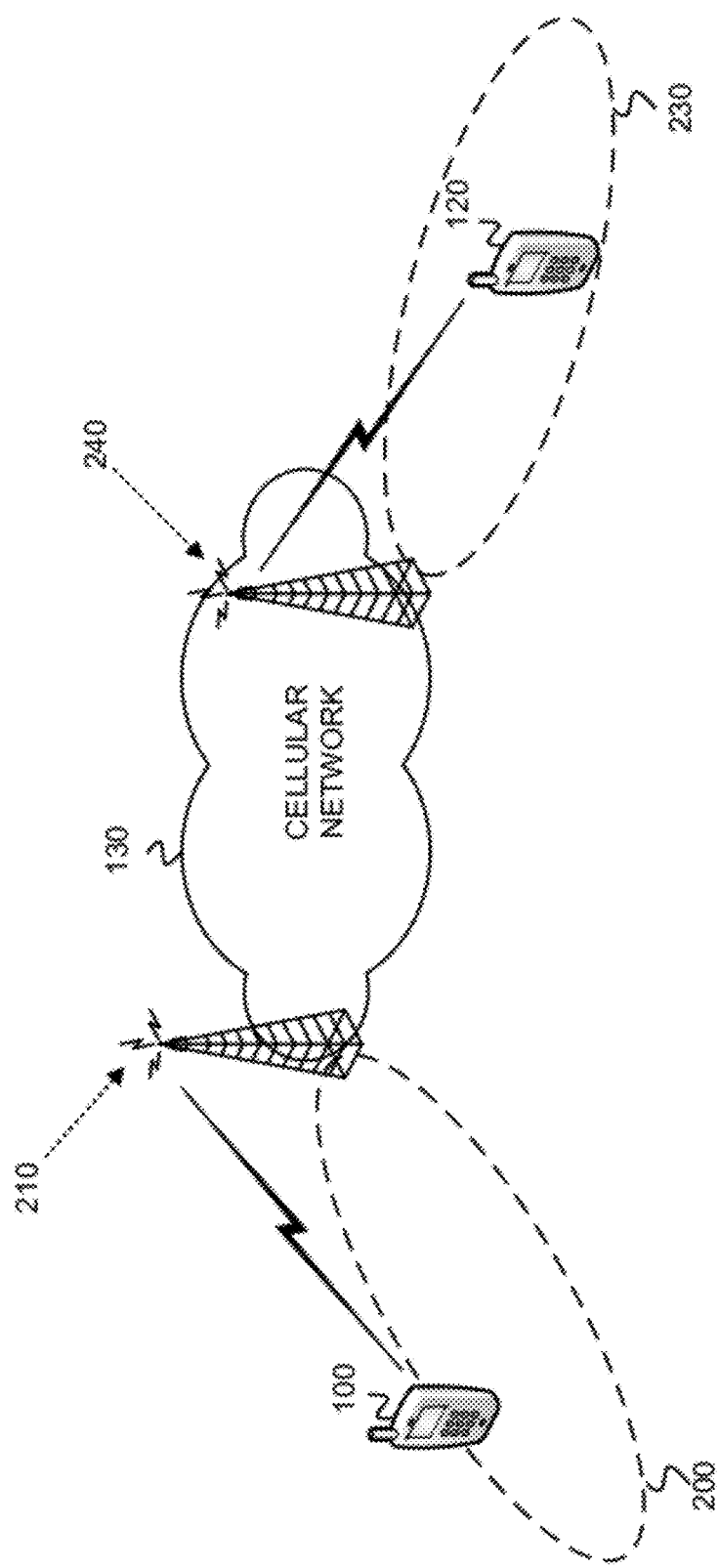

FIGS. 2A-2C depict examples of the determination of a proximity between sender 100 and recipient 120. FIG. 2A shows an example in which sender 100 is served by a first antenna sector 200 of an antenna of a base station 210 of cellular network 130 (shown in FIG. 1), and recipient 120 is served by a second antenna sector 220 of an antenna of base station 210. In the example of FIG. 2A, since sender 100 is being served by a different antenna sector of base station 210 than recipient 120, then sender 100 may be determined to not have sufficient network proximity to recipient 120. In this case, sender 100 may transfer data to recipient 120 via cellular network 130.

FIG. 2B depicts an example in which sender 100 is served by the first antenna sector 200 of an antenna of base station 210 of cellular network 130, and recipient 120 is served by an antenna sector 230 of an antenna of another base station 240 of cellular network 130. In the example, of FIG. 2B, since sender 100 is being served by a different base station of cellular network 130, then sender 100 may be determined to not have sufficient network proximity to recipient 120. In this case, sender 100 may transfer data to recipient 120 via cellular network 130.

FIG. 2C shows an example in which sender 100 and recipient 120 are served by antenna sector 200 of an antenna of base station 210 of cellular network 130 (not shown in FIG. 2C). As additionally shown in FIG. 2C, sender 100 is located within close geographic proximity 250 to recipient 120 within antenna sector 200. In the example of FIG. 2C, since sender 100 is being served by a same antenna sector of a same antenna of a same base station, and because sender 100 is also within a close geographic proximity to recipient 120, then sender 100 may be determined to have sufficient network proximity and geographic proximity to recipient 120. In this case, sender 100 may transfer data to recipient 120 via local wireless connectivity 150 (shown in FIG. 1).

Figure 3:
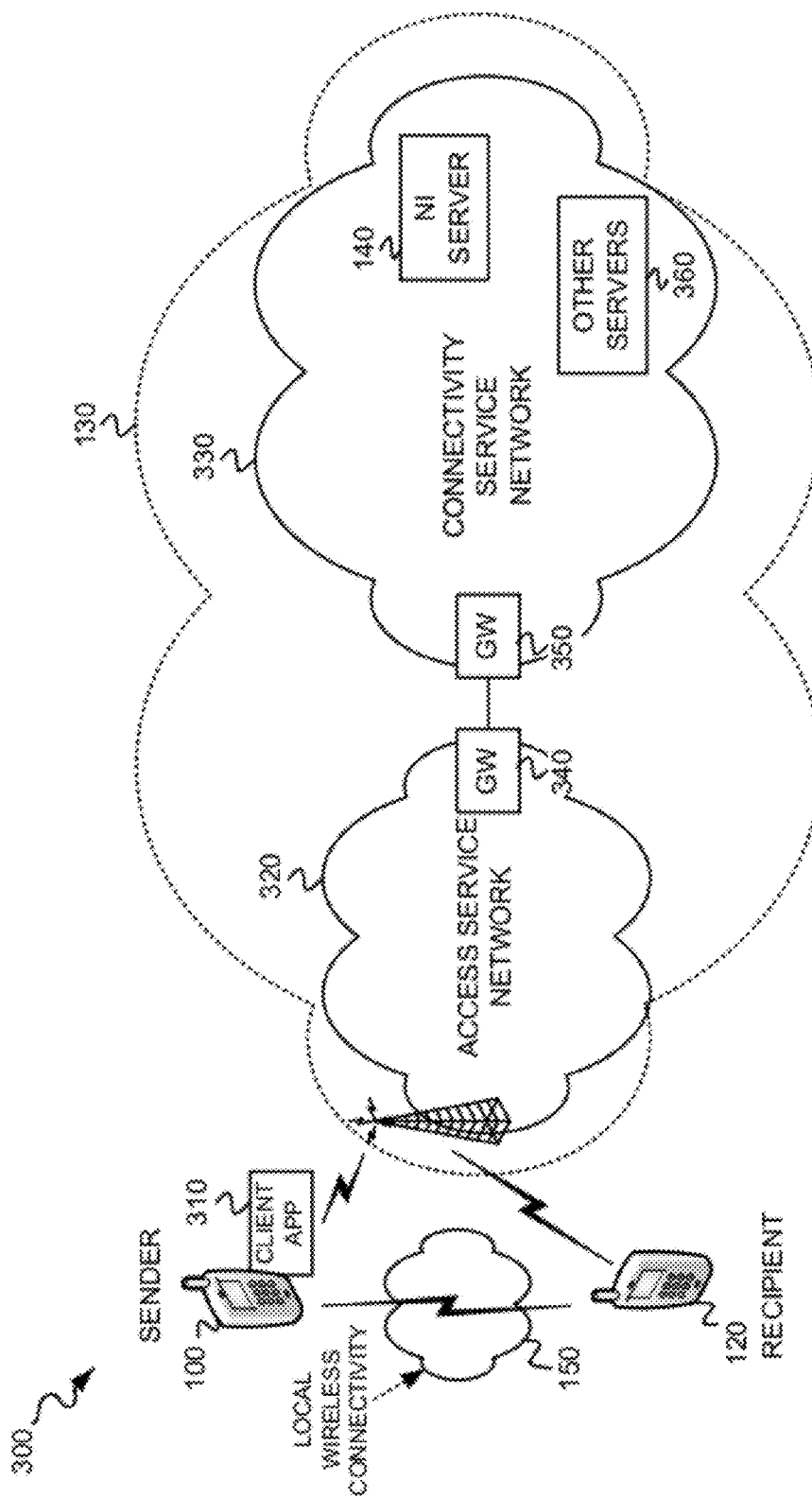
FIG. 3 is a diagram that illustrates an exemplary network environment in which the sender of FIG. 1 selectively uses local wireless connectivity for transferring data to the recipient of FIG. 1 instead of using a connection via an OTA segment of the cellular network.

FIG. 3 depicts an exemplary network environment 300 in which sender 100 may selectively use local wireless connectivity 150 for transferring data to recipient 120 instead of using a connection via an OTA segment of cellular network 130. Network environment 300 may include sender 100, recipient 120, cellular network 130 and local wireless connectivity 150. As further shown in FIG. 3, cellular network 130 may include an access service network 320, and a connectivity service network 330.

Sender 100 may include a client application (app) 310 that may execute to perform functionality described further below. Cellular network 130, as shown in FIG. 3, may include an access service network 320 interconnected with a connectivity service network 330 via gateways 340 and 350. Connectivity service network 330 may further include a NI server 140 and other servers 360.

Access service network (ASN) 320 may include network components, including an OTA segment, for communicating with wireless devices (e.g., sender 100 and recipient 120) and for routing data to/from the wireless devices. ASN 320 may include, for example, one or more base stations, one or more switching nodes, and a gateway 340 for connecting to connectivity service network 330.

Connectivity service network 330 may include network switching components for routing data from a sending device to a recipient device, a gateway 350 for connecting to ASN 320, NI server 140, and other servers 360. Other servers 360 may include an authentication server (e.g., authentication, authorization and accounting (AAA) server); a billing information server; a dynamic host configuration protocol (DHCP) server; a foreign agent/autonomous system number or a home agent; a network device storing user profile information; and/or a network device storing current sender and recipient location information (both geographic and network topological location information). NI server 140 may obtain information from other servers 360 related to sender 100 and recipient 120 to enable NI server 140 to determine whether to instruct sender 100 and recipient 120 to transfer data between one another via local wireless connectivity 150 instead of via cellular network 130.

The configuration of network components of network environment 300 illustrated in FIG. 3 is for illustrative purposes only. Other configurations may be implemented. Therefore, network environment 300 may include additional, fewer and/or different components than those depicted in FIG. 3.

Figure 4:
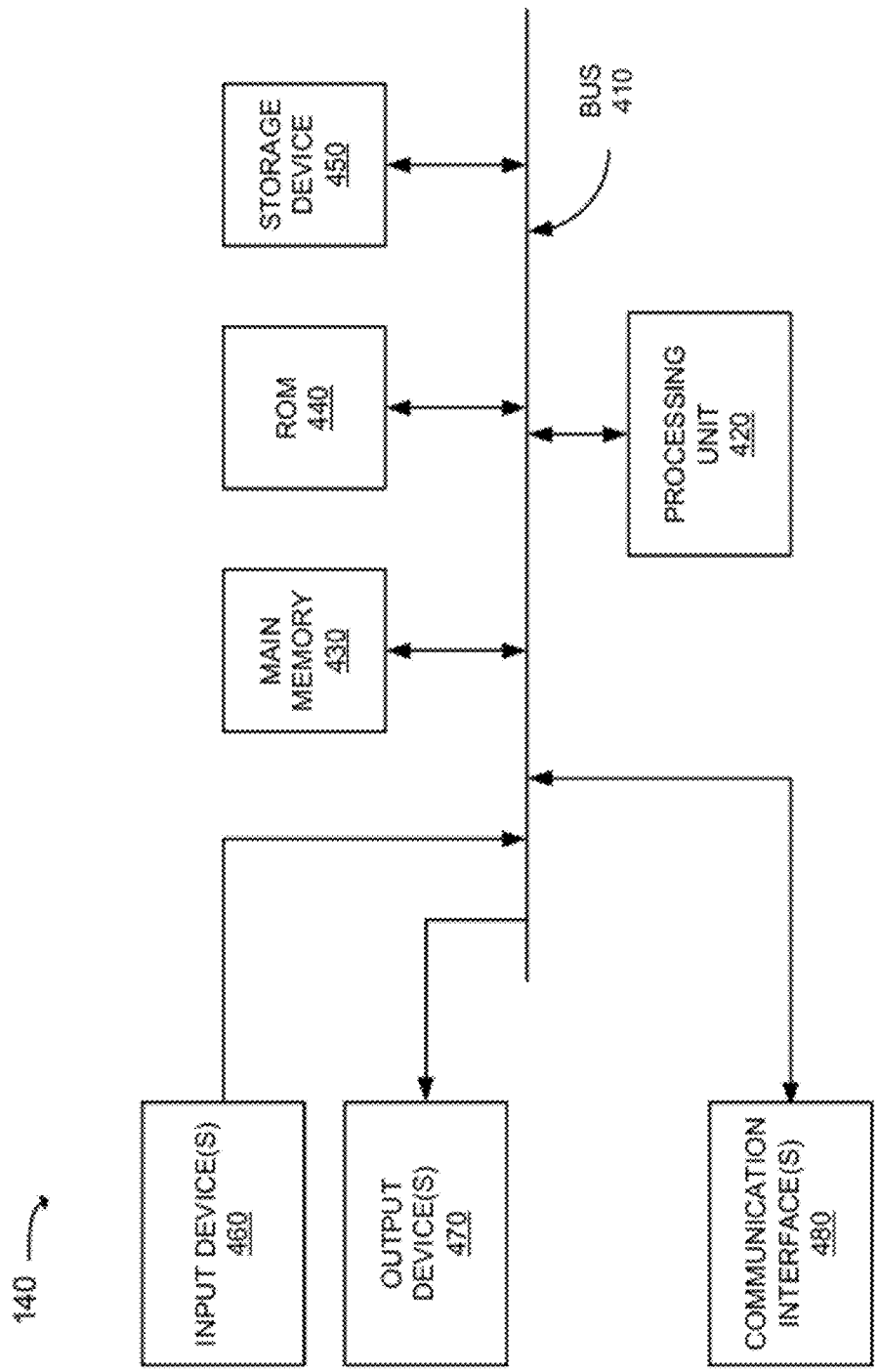
FIG. 4 is a diagram that depicts exemplary components of the Network Information server of FIG. 1.

FIG. 4 is a diagram that depicts exemplary components of NI server 140. Sender 100 and recipient 120 may be similarly configured. NI server 140 may include a bus 410, a processing unit 420, a main memory 430, a read only memory (ROM) 440, a storage device 450, an input device(s) 460, an output device(s) 470, and a communication interface(s) 480. Bus 410 may include a path that permits communication among the elements of NI server 140.

Processing unit 420 may include one or more processors or microprocessors, or processing logic, which may interpret and execute instructions. Main memory 430 may include a random access memory (RAM) or another type of dynamic storage device that may store information and instructions for execution by processing unit 420. ROM 440 may include a ROM device or another type of static storage device that may store static information and instructions for use by processing unit 420. Storage device 450 may include a magnetic and/or optical recording medium.

Input device 460 may include one or more mechanisms that permit an operator to input information to NI server 140, such as, for example, a keypad or a keyboard, a display with a touch sensitive panel, voice recognition and/or biometric mechanisms, etc. Output device 470 may include one or more mechanisms that output information to the operator, including a display, a speaker, etc. Communication interface(s) 480 may include a transceiver that enables NI server 140 to communicate with other devices and/or systems. For example, communication interface(s) 480 may include wired or wireless transceivers for communicating via connectivity service network 330. Sender 100 and recipient 120 may each include a first wireless transceiver for communicating via cellular network 130, and a second wireless transceiver for communicating via local wireless connectivity 150 (e.g., a BlueTooth transceiver).

The configuration of components of NI server 140 illustrated in FIG. 4 is for illustrative purposes only. Other configurations may be implemented. Therefore, NI server 140 may include additional, fewer and/or different components than those depicted in FIG. 4.

Figure 5A:
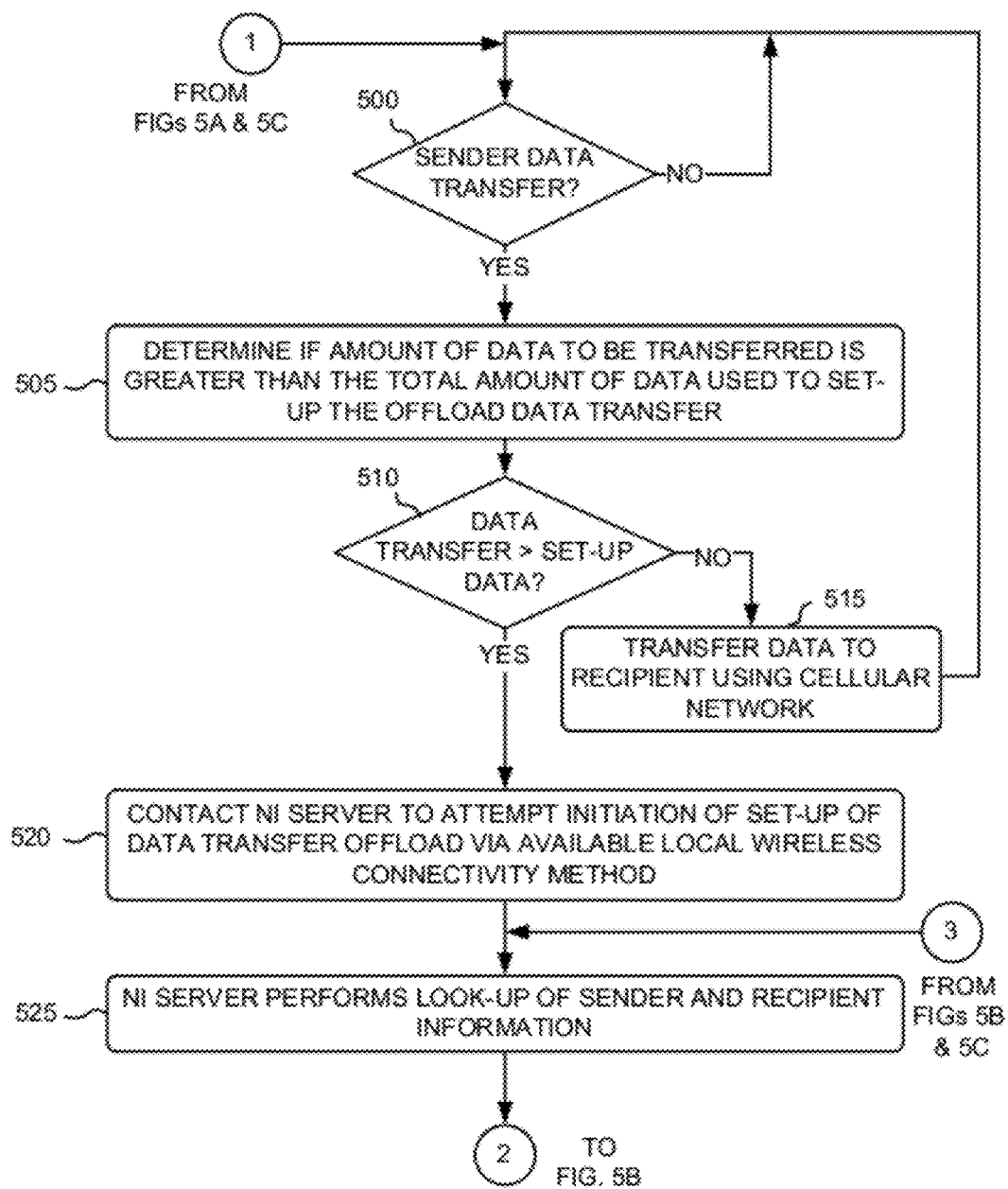
FIGS. 5A, 5B, and 5C are flow diagrams that illustrate an exemplary process for selectively offloading the transfer of data from a cellular network to local wireless connectivity at a mobile communication device.
Figure 5B:
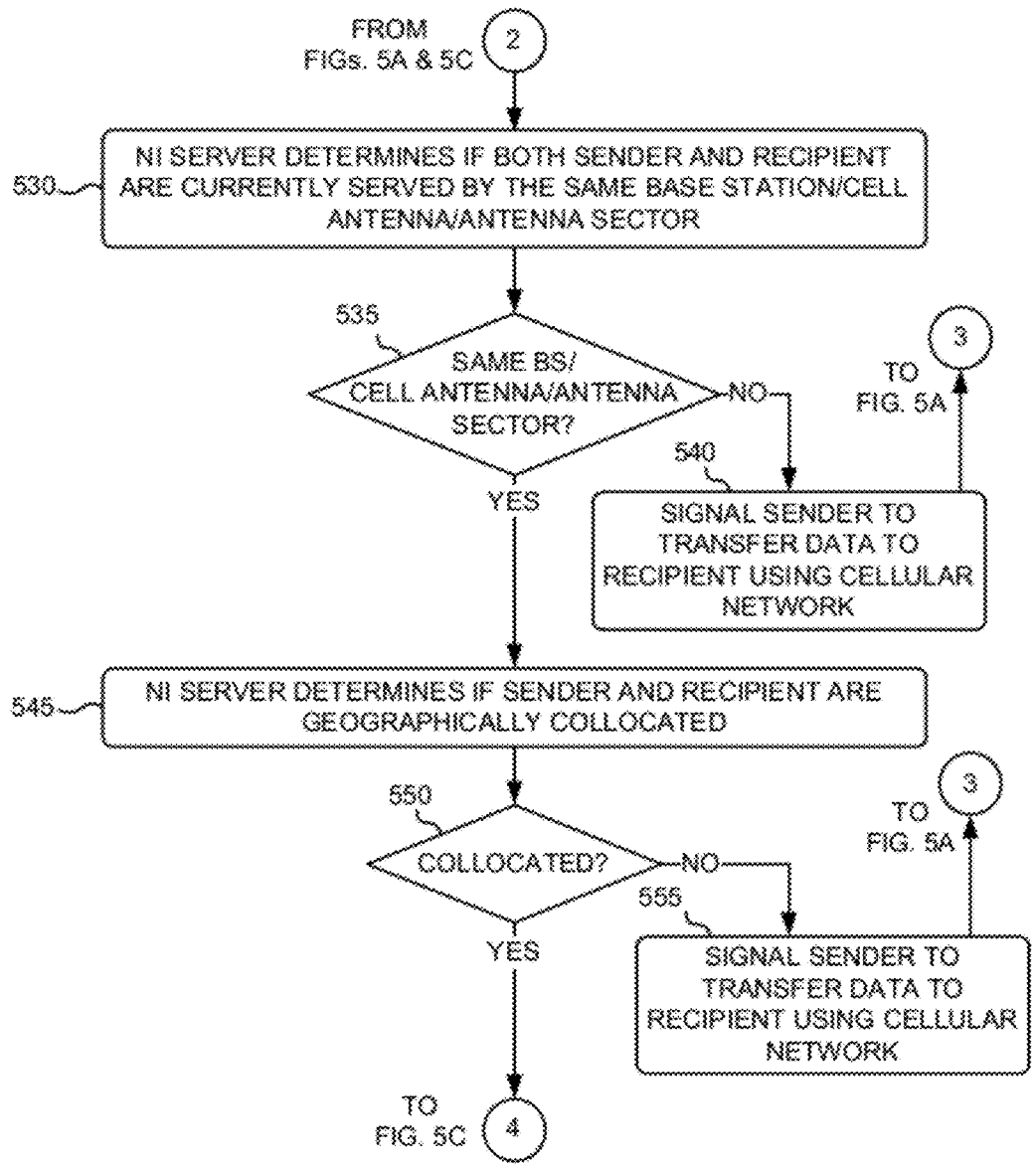

FIGS. 5A and 5B are flow diagrams that illustrate an exemplary process for selectively offloading the transfer of data from a cellular network to local wireless connectivity at a mobile communication device. The exemplary process of FIGS. 5A and 5B may be implemented by NI server 140 in conjunction with client application 310 of sender 100. The exemplary process of FIGS. 5A and 5B is described below with reference to the exemplary messaging diagram of FIG. 6.

Figure 6:
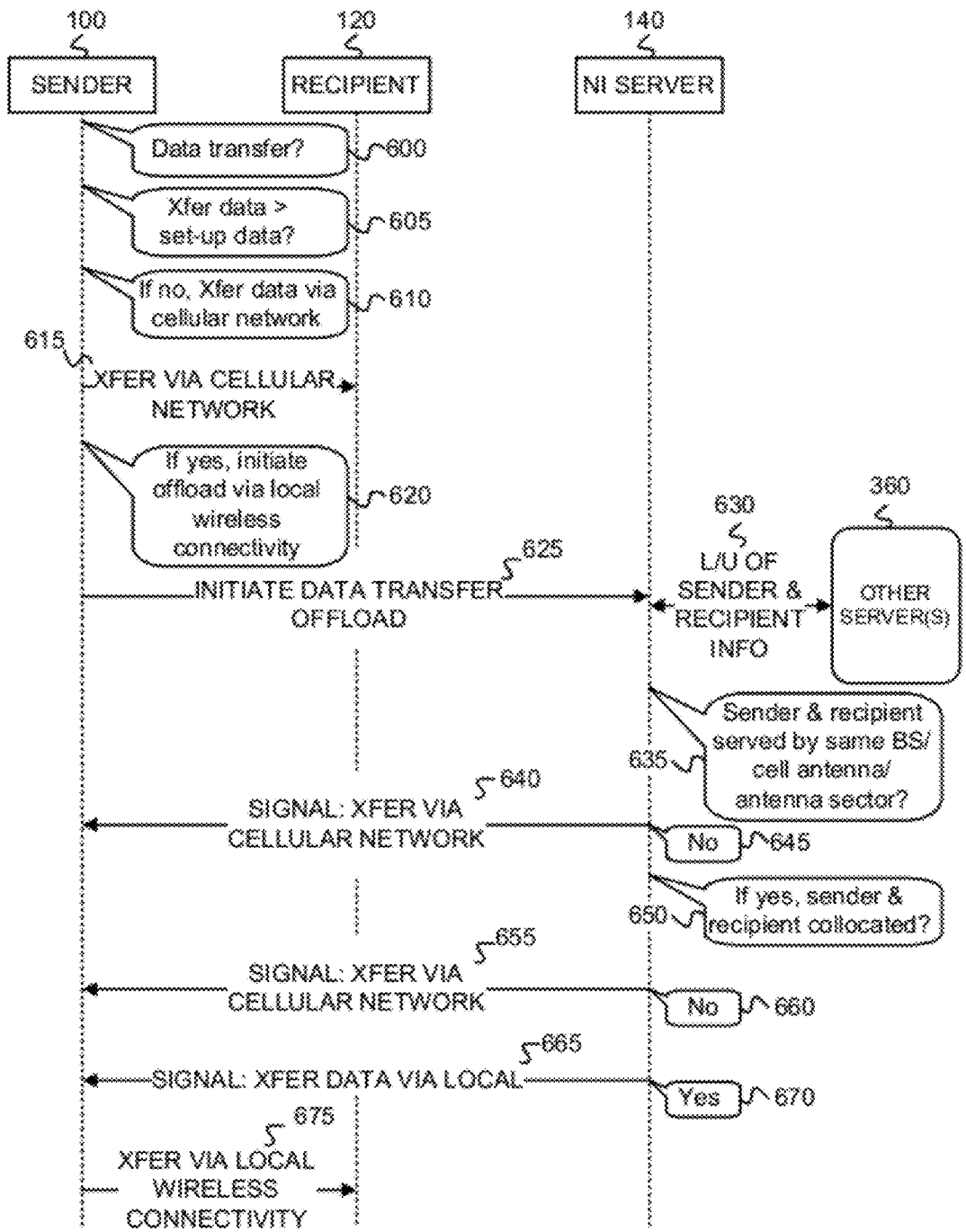
FIG. 6 is an exemplary messaging diagram associated with the exemplary process of FIGS. 5A, 5B, and 5C.

The exemplary process may include determining if sender 100 has initiated data transfer with recipient 120 (block 500). A user at sender 100 may enter, into the mobile communication device, an identifier associated with recipient 120 (e.g., telephone number, network address, etc.) and then select data to be transferred. Various existing types of identifiers may be used for initiating the data transfer with recipient 120. Client application 210 of sender 100 may then determine if the user has entered, for example, "send," thus, initiating the transfer of data via either cellular network 130 or via local wireless connectivity 150. FIG. 6 depicts sender 100 determining if the user has initiated the data transfer 600 with recipient 120.

Client application 310 of sender 100 may determine if the total amount of data to be transferred is greater than the total amount of data expected to be used to set-up the offload of the data transfer via local wireless connectivity 150 (block 505). For example, if x is the total amount of data to be transferred from sender 100 to recipient 120 and y is the total amount of data expected to be transmitted over cellular network 130, to set-up the offload of the data transfer to local wireless connectivity 150, then client application 310 may determine if x is greater than y. The total amount of data expected to be used to set-up the offload of the data transfer may vary depending on the specific control mechanism used and also on the medium used (i.e., Code Division Multiple Access (CDMA) vs. 3G vs. 4G). Client application 310 may obtain information regarding the total amount of data expected to be used to set-up the offload of the data transfer per network type, and may perform a local comparison with the total amount of data expected to be transferred before determining whether to initiate a data transfer offload. In other implementations, total amount of set-up data may be fixed by the network provider. FIG. 6 depicts sender 100 determining 605 if the transfer data is greater than the set-up data.

If the total amount of data to be transferred is not greater than the total amount of set-up data (NO—block 510), then the data may be transferred from sender 100 to recipient 120 using cellular network 130 (block 515). FIG. 6 shows sender 100 determining 610 that the transfer data is not greater than the set-up data, and transferring 615 the data via the cellular network. If the total amount of data to be transferred is greater than the total amount of set-up data (YES—block 515), then client application 310 of sender 100 may contact NI server 140 to attempt to initiate the set-up of the data transfer offload via the available local wireless connectivity method (block 520). FIG. 6 depicts sender 100 determining 620 that the transfer data is greater than the set-up data and attempting to initiate data transfer offload 625 via the local wireless connectivity. Multiple local wireless connectivity methods may be available to sender 100 and recipient 120 (e.g., BlueTooth and Wi-Fi) and sender 100 or NI server 140 may select one of the available methods for use instead of cellular network 130.

NI server 140 may perform a look-up of sender and recipient information (block 525). One or more other servers and/or network devices in cellular network 130 may be accessed to look-up sender and/or recipient information. NI server 140 may perform a look-up of sender and/or recipient user profile information, network proximity information, geographic proximity information, user device capabilities, or other types of information. The other servers and/or network devices may include an authentication server (e.g., authentication, authorization and accounting (AAA) server); a billing information server; a dynamic host configuration protocol (DHCP) server; a foreign agent/autonomous system number or a home agent; a network device storing user profile information; a network device storing user device capabilities (e.g., radio type, Bluetooth capability, WiFi capability, Infrared capability, etc.); or a network device storing current sender and recipient location information (both physical and network topological location information). FIG. 6 depicts NI server 140 performing a look-up 630 of sender and recipient information from other servers 360 to obtain information related to sender 100's and/or recipient 120's network and/or geographic proximity, or other types of information.

NI server 140 may determine if both sender 100 and recipient 120 are currently served by the same base station, cell antenna, and/or antenna sector (block 530). Generally speaking, NI server 140, based on the look-up of the sender and recipient information of block 525, may determine the proximity of sender 100 and recipient 120 in a network topology sense. In one exemplary implementation, NI server 140 may determine if sender 100 and recipient 120 are currently served by the same base station, cell antenna, and/or antenna sector of cellular network 130. In other implementations, different components of the network topology may be used. FIG. 6 shows NI server 140 determining 635 if sender 100 and recipient 120 are served by the same base station, cell antenna and/or antenna sector.

If both sender 100 and recipient 120 are not currently served by the same base station, cell antenna and/or antenna sector (NO—block 535), then NI server 140 may signal sender 100 to transfer the data to recipient 120 using cellular network 130 (block 540). As shown in FIG. 6, NI server 140 may determine 645 that sender 100 and recipient 120 are not served by the same base station, cell antenna and/or antenna sector, and may then signal 640 sender 100 to transfer the data via the cellular network. In a circumstance where a data transfer is already in progress via cellular network 130, then no signaling from NI server 140 may be necessary, and the data transfer via cellular network 130 may be permitted to continue. In a further circumstance where the data transfer is already in progress via the local wireless connectivity, then NI server 140 may signal sender 100 to continue the data transfer via cellular network 130.

If both sender 100 and recipient 120 are currently served by the same base station, cell antenna and/or antenna sector (YES—block 535), then NI server 140 may determine if sender 100 and recipient 120 are geographically collocated (e.g., located within a predetermined distance of each other) (block 545). NI server 140 may determine whether sender 100 and recipient 120 are geographically collocated using Global Positioning System (GPS) location information from sender 100 and recipient 120, using cellular network triangulation data associated with the location of sender 100 and recipient 120, or a user prompt to either sender 100 or recipient 120 inquiring as to their physical proximity (e.g., "Is recipient currently with you or close to you?"). FIG. 6 depicts NI server 140 determining 650 if sender 100 and recipient 120 are geographically collocated. If sender 100 and recipient 120 are not geographically collocated (NO—block 550), then sender 100 may transfer data to recipient 120 using cellular network 130 (block 555). As shown in FIG. 6, if NI server 140 determines 660 that sender 100 and recipient 120 are not geographically collocated, then NI server 140 may signal 655 sender 100 to transfer the data using the cellular network. For example, sender 100 may transfer the data to recipient 120 via a first wireless transceiver and cellular network 130. In a circumstance where a data transfer is already in progress via cellular network 130, then no signaling from NI server 140 may be necessary, and the data transfer via cellular network 130 may be permitted to continue. In a further circumstance where the data transfer was already in progress via the local wireless connectivity, then NI server 140 may signal sender 100 to continue the data transfer via cellular network 130.

If sender 100 and recipient 120 are geographically collocated (YES—block 560), then NI server 140 may signal sender 100 and recipient 120 to remotely enable the data transfer via an available local wireless connectivity method (block 560). As shown in FIG. 6, if NI server 140 determines 670 that sender 100 and recipient 120 are geographically collocated, then NI server 140 may signal 665 sender 100 to transfer the data via an available local wireless connectivity method. For example, sender 100 may transfer the data to recipient 120 via a second wireless transceiver and the local wireless connectivity (e.g., a BlueTooth transceiver over a BlueTooth connection). In a circumstance where the data transfer is already in progress via the local wireless connectivity method, then no signaling from NI server 140 may be necessary, and the data transfer may be permitted to continue via the local wireless connectivity method. In a circumstance where the data transfer is already in progress via cellular network 130, NI server 140 may signal sender 100 and recipient 120 to continue data transfer via the available local wireless connectivity.

A determination may be made whether the data transfer is complete (block 565). In some implementations, sender 100 may signal NI server 140 that the data transfer has completed. If the data transfer is complete (YES—block 565), then the exemplary process may continue at block 500 with a determination whether sender 100 has initiated another data transfer with recipient 120. If the data transfer is not complete (NO—block 560), then the exemplary process may continue at block 525 with another look-up of sender and recipient information (block 525), and determinations of current network proximity (e.g., block 530), and current geographic proximity (e.g., block 545).

Several specific examples of the application of the exemplary process of FIGS. 5A and 5B are described below. In a first example, a user attempts to send a video to a friend at a party. The cellular network recognizes that both users are collocated geographically, and determines the characteristics of their devices, and the presence of appropriate client software on both devices. The cellular network (i.e., the NI server) instructs both user devices to enable their common personal area network (PAN) channel (e.g., Bluetooth) and send the video files via local wireless connectivity, and then return to each device's state prior to the video data transfer.

In a further example, a user walks into a bar, and causes certain patrons of the bar to laugh because of his jokes. The event is captured on video or photos by the user who wishes to share the event with the "regular" bar patrons. The user sends Short Message Service (SMS) messages to the phones of these patrons to attempt to transfer the captured video or photos to the patrons. The cellular network (i.e., the NI server) determines that most of the devices of the patrons are geographically collocated and instructs these devices to transfer directly via local wireless connectivity. A few of the patrons, and Facebook uploads, are determined to be non-local and are passed via the cellular network.

In an additional example, a user calls a co-worker in a same building using "push-to-talk." The cellular network recognizes that both users are geographically collocated, and instructs the devices of both users to enable their common PAN channel. The sender's device is instructed to make a directed broadcast to reach the recipient's device. Both devices return to a normal state once the cellular network determines that they are out of local wireless connectivity range.

In yet another example, two students are texting at a same high school. The cellular network (i.e., the NI server) recognizes that bother users are geographically collocated, and instructs the devices of both users to enable their common PAN channel. The sender's device is instructed to make a directed broadcast to reach the recipient's device. Both devices return to a normal state once the cellular network determines that they are out of local wireless connectivity range.

In another example, a user is playing a game on his smartphone with another person. The cellular network (i.e., the NI server) recognizes that the user and the other person are geographically collocated, and instructs the devices of the user and the other person to enable their common PAN channel. Data related to the playing of the game is sent between the devices of the user and the other person via the common PAN channel. When the game play is stopped, both of the devices of the user and the other person return to the state they were in prior to use of the common PAN channel.

Figure 5C:
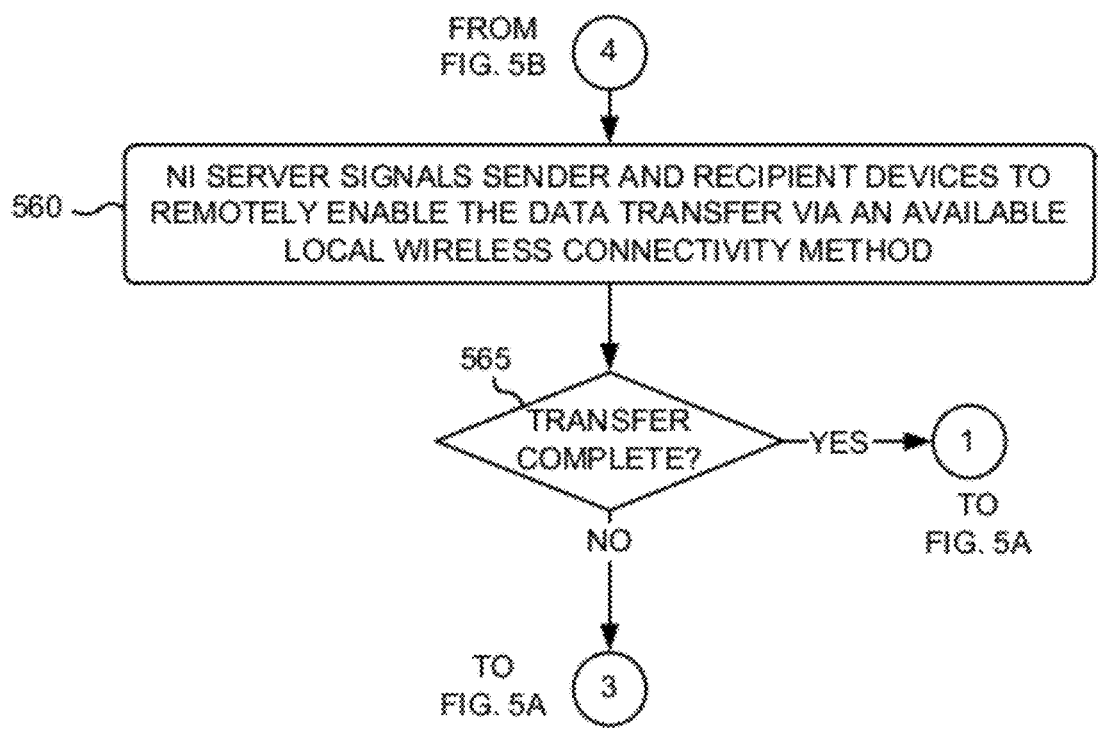

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5A, 5B and 5C, the order of the blocks may be varied in other implementations. Moreover, non-dependent blocks may be performed in parallel. Other types of identifying whether users are in close proximity, than those described herein, may be used in other implementations.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, at a first mobile communication device, an instruction to initiate a data transfer to a second mobile communication device;
determining whether an amount of data to be transferred to the second mobile communication device is greater than a total amount of data expected to be used to set-up an offload of the data transfer via local wireless connectivity;
transferring the data to the second mobile communication device using a cellular network if the amount of data to be transferred to the second mobile communication device is less than or equal to the total amount of data expected to be used to set-up the offload of the data transfer via local wireless connectivity;
sending a message from the first mobile communication device to a network device via the cellular network to attempt to initiate the set-up of the data transfer via the local wireless connectivity if the amount of data to be transferred to the second mobile communication device is greater than the total amount of data expected to be used to set-up the offload of the data transfer via the local wireless connectivity; and
receiving signaling responsive to the message, at the first mobile communication device from the network device, instructing the first mobile communication device to transfer data to the second mobile communication device either via the local wireless connectivity or via the cellular network based on a network proximity or geographic proximity between the first mobile communication device and the second mobile communication device determined by the network device.

2. The method of claim 1, wherein the first and second mobile communication devices each comprise one of a desktop, laptop, palmtop, or tablet computer; a cellular telephone; a personal digital assistant (PDA); a media player device; or a digital camera.

3. The method of claim 1, wherein the network device comprises a Network Information (NI) server in the cellular network.

4. The method of claim 1, wherein the network proximity determined by the network device comprises the first mobile communication device and the second mobile communication device being currently served by a same cellular network base station, antenna, or antenna sector.

5. The method of claim 1, wherein the geographic proximity determined by the network device comprises the first mobile communication device and the second mobile communication device being geographically located within a certain distance of each other.

6. The method of claim 1, wherein the local wireless connectivity comprises a personal area network (PAN) channel.

7. The method of claim 1, wherein the local wireless connectivity comprises a Bluetooth, WiFi, infrared, or ultra-wideband connection.

8. A network device, comprising:
a communication interface coupled to a cellular network and configured to receive, from a first mobile communication device via the cellular network, a message to initiate set-up of a transfer of data between the first mobile communication device and a second mobile communication device; and
a processing unit configured to:
determine a proximity of the first mobile communication device with respect to the second mobile communication device,
signal, via the communication interface, the first mobile communication device to transfer the data to the second mobile communication device via local wireless connectivity if the determined proximity comprises a first proximity, wherein the local wireless connectivity comprises a Bluetooth, WiFi, infrared, or ultra-wideband connection to transfer the data, and
signal, via the communication interface, the first mobile communication device to transfer the data to the second mobile communication device via the cellular network if the determined proximity comprises a second proximity that is different than the first proximity.

9. The network device of claim 8, wherein the first and second mobile communication devices each comprise one of a desktop, laptop, palmtop, or tablet computer; a cellular telephone; a personal digital assistant (PDA); a media player device; or a digital camera.

10. The network device of claim 8, wherein the network device comprises a Network information (NI) server in the cellular network.

11. The network device of claim 8, wherein the first proximity comprises the first mobile communication device and the second mobile communication device currently being served by a same cellular network base station, antenna, or antenna sector and the first mobile communication device and the second mobile communication device being currently located within a certain distance of each other.

12. The network device of claim 11, wherein the second proximity comprises the first mobile communication device and the second mobile communication device currently not being served by a same cellular network base station, antenna or antenna sector or the first mobile communication device and the second mobile communication device currently not being located within a certain distance of each other.

13. A mobile communication device, comprising:
a first communication interface connected to a cellular network and configured to:
send, to a network device via the cellular network, a message to attempt to initiate set-up of a transfer of data to another mobile communication device, and
receive, from the network device, first signaling or second signaling responsive to the message;
a second communication interface configured to communicate via local wireless connectivity; and
a processing unit configured to:
initiate the transfer of the data to the other mobile communication device via the cellular network and the first communication interface if the first signaling is received from the network device, or
initiate the transfer of the data to the other mobile communication device via the local wireless connectivity and the second communication interface if the second signaling is received from the network device.

14. The mobile communication device of claim 13, wherein the mobile communication device comprises a desktop, laptop, palmtop, or tablet computer; a cellular telephone; a personal digital assistant (PDA); a media player device; or a digital camera.

15. The mobile communication device of claim 13, wherein the network device comprises a Network Information (NI) server in the cellular network.

16. The mobile communication device of claim 13, wherein the local wireless connectivity comprises a personal area network (PAN) channel.

17. The mobile communication device of claim 13, wherein the local wireless connectivity comprises a Bluetooth, WiFi, infrared, or ultra-wideband connection.

18. A method, comprising:
receiving, at a network device from a first mobile communication device via a cellular network, a message to initiate a set-up of data transfer between the first mobile communication device and a second mobile communication device;
determining, at the network device, a proximity of the first mobile communication device with respect to the second mobile communication device;
signaling, from the network device via the cellular network, the first mobile communication device to transfer data between the first mobile communication device and the second mobile communication device via local wireless connectivity if the determined proximity comprises a first proximity; and
signaling, from the network device via the cellular network, the first communication device to transfer data between the first mobile communication device and the second mobile communication device via the cellular network if the determined proximity comprises a second proximity that is different than the first proximity.

19. The method of claim 18, wherein the first proximity comprises the first mobile communication device and the second mobile communication device being currently served by a same cellular network base station, antenna or antenna sector and the first mobile communication device and the second mobile communication device being currently located within a certain distance of each other.

20. The method of claim 19 wherein the second proximity comprises the first mobile communication device and the second mobile communication device currently not being served by a same cellular network base station, antenna or antenna sector or the first mobile communication device and the second mobile communication device currently not being located within a certain distance of each other.

21. The method of claim 18, wherein the local wireless connectivity comprises a Bluetooth, WiFi, infrared, or ultra-wideband connection.

* * * * *